United States Patent [19]
Shapiro

[11] 3,707,991
[45] Jan. 2, 1973

[54] REMOTE CONTROLLED VALVE FOR IRRIGATION SYSTEMS

[76] Inventor: Jonas M. Shapiro, 177 Saw Mill Road, Stamford, Conn. 06903

[22] Filed: April 12, 1971

[21] Appl. No.: 133,028

[52] U.S. Cl.............................137/625.11, 137/625.21
[51] Int. Cl.................................................F16k 11/02
[58] Field of Search........137/625.21, 625.24, 625.23, 137/625.22, 625.11

[56] References Cited

UNITED STATES PATENTS

| 3,319,655 | 5/1967 | Palmer | 137/625.11 |
| 3,008,490 | 11/1961 | Angelos | 137/625.11 |
| 3,288,432 | 11/1966 | Ferrin et al. | 137/625.11 X |
| 3,618,637 | 11/1971 | Santomieri | 137/625.11 |
| 3,610,285 | 10/1971 | Passaggio | 251/368 X |

FOREIGN PATENTS OR APPLICATIONS

| 928,299 | 6/1963 | Great Britain | 137/625.11 |

*Primary Examiner*—Henry T. Klinksiek
*Assistant Examiner*—Robert J. Miller
*Attorney*—Daniel Jay Tick

[57] ABSTRACT

A rotatable valve member of Delrin plastic material is coaxially positioned in the main housing portion of a housing of Delrin plastic material and is adapted to be rotated about its axis to connect an inlet port to each of a plurality of outlet ports in a selected sequence.

5 Claims, 5 Drawing Figures

3,707,991
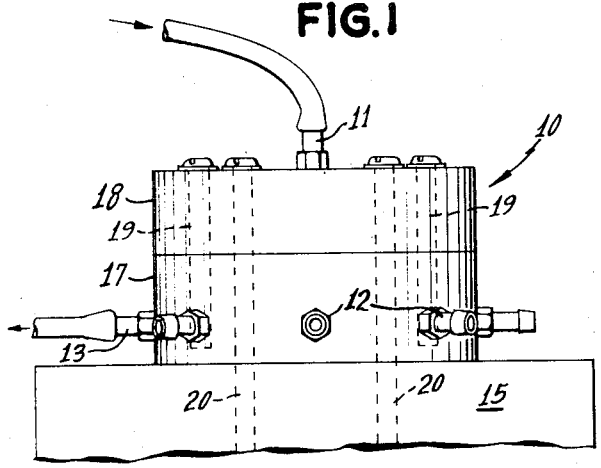
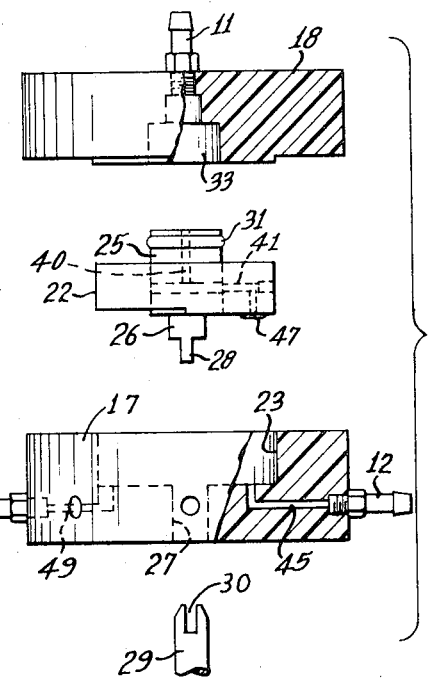
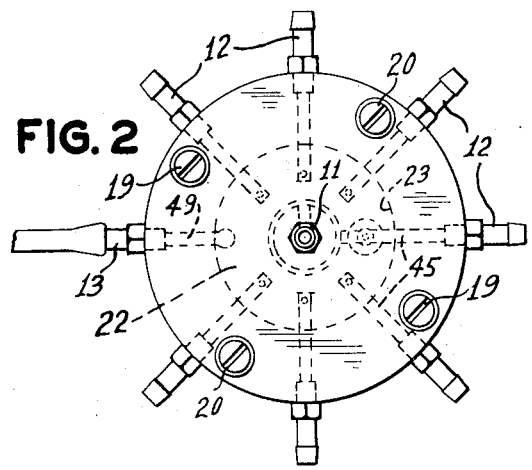
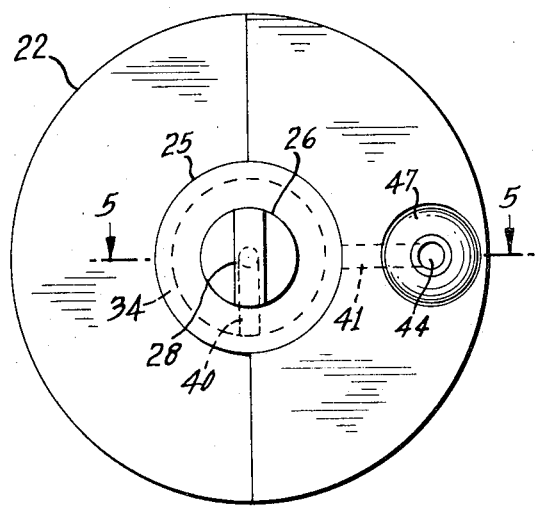
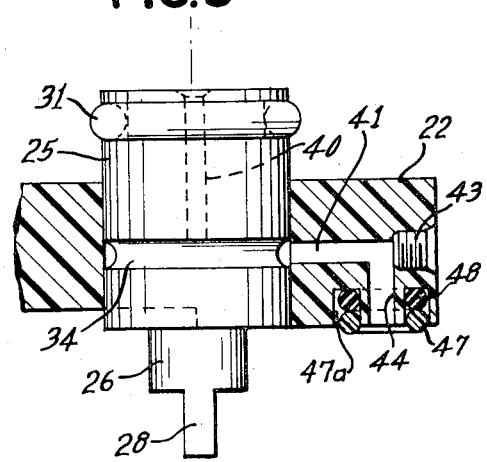
INVENTOR
JONAS M. SHAPIRO
By Daniel Jay Tick
HIS ATTORNEY

REMOTE CONTROLLED VALVE FOR IRRIGATION SYSTEMS

DESCRIPTION OF THE INVENTION

The present invention relates to a remote controlled valve for irrigation systems. More particularly, the invention relates to a motor-operated valve which is specially adapted for programmed operation of a plurality of sprinklers in an irrigation system under the control of a central control station.

Irrigation systems covering large areas such as, for example, golf courses, utilize large numbers of remote controlled valves to control sufficient numbers of sprinkler units to provide adequate irrigation. Maintenance and supervision of the valves is costly.

The principal object of the present invention is to provide a new and improved remote controlled valve for irrigation systems, which valve requires very little maintenance and no supervision.

An object of the invention is to provide a new and improved remote controlled valve which may be installed either above or below ground.

Another object of the invention is to provide a new and improved remote controlled valve which has a long useful service life.

Another object of the invention is to provide a new and improved remote controlled valve of simple structure, which is efficient, effective and reliable in operation.

Still another object of the invention is to provide a remote controlled valve which operates essentially without friction or at low load.

In accordance with the invention, a valve comprises a housing having an axis, a main housing portion having a peripheral surface, a substantially axial recess formed therein and a plurality of angularly spaced conduits formed therein and opening at the recess and extending radially substantially perpendicularly to the axis of the housing to the peripheral surface of the main housing portion, and a cover portion having a substantially axial bore formed therethrough. An inlet port opening into the bore of the cover portion of the housing. Each of a plurality of outlet ports at the peripheral surface of the main housing portion of the housing opens into a corresponding one of the conduits. A rotatable valve member of plastic material is coaxially positioned in the recess in the main housing portion of the housing and has duct means therein for conducting fluid from the inlet port to each of the outlet ports via the conduits of the main housing portion of the housing in a selected sequence. The valve member is adapted to be rotated about its axis to connect the duct means thereof to each of the conduits in the selected sequence.

Each of the main housing portion and the cover portion of the housing comprises plastic material. The valve member comprises Delrin. Each of the main housing portion and the cover portion of the housing comprises Delrin.

A drain port is provided at the peripheral surface of the main housing portion of the housing and an exhaust conduit is formed in the main housing portion and extends substantially perpendicularly to the axis of the housing from the recess formed therein to the peripheral surface thereof at the drain port.

The valve member comprises Delrin of substantially cylindrical configuration having an axis which is small relative to its radius and fitting in the recess in the main housing portion of the housing. A bearing for the valve member comprises a metal central pin member coaxially mounted in the cylindrical part thereof and having an area fitting into part of the bore formed through the cover portion of the housing. A sealing O-ring is provided around the pin member in the area thereof fitting into the part of the bore of the cover portion for sealing the pin member in the bore. The pin member of the valve member is of substantially cylindrical configuration having a periphery with a substantially annular groove formed therearound and a bore formed therein along the axis thereof and opening into the groove. The cylindrical part of the valve member has a bottom surface and a conduit formed in the valve member and extending substantially perpendicularly to the axis of the valve member and opening from the groove of the pin member to the bottom surface of the cylindrical part of the valve member at a point at which the conduit opens into each of the conduits formed in the main housing portion of the valve at the recess of the main housing portion as the valve member rotates about its axis. The cylindrical part of the valve member has an annular notch coaxially formed in the bottom surface thereof. A sealing Teflon O-ring is provided in the notch and a sealing rubber O-ring is coaxially positioned in the notch and in juxtaposition with the Teflon O-ring for resiliently holding the Teflon O-ring in position and for providing a tight seal around the conduit opening at the bottom surface of the cylindrical part of the valve member.

In order that the invention may be readily carried into effect, it will now be described with reference to the accompanying drawing, wherein:

FIG. 1 is a side elevation of an embodiment of the valve of the present invention;

FIG. 2 is a top elevation of the valve of FIG. 1;

FIG. 3 is an exploded view, partly in section, of the valve of FIGS. 1 and 2;

FIG. 4 is a top view, on an enlarged scale, of the rotatable valve member 22 of the valve of FIGS. 1, 2 and 3; and FIG. 5 is a view taken along the lines 5 — 5 of FIG. 4.

In the FIGS., the same components are identified by the same reference numerals.

As shown in FIGS. 1, 2 and 3, a valve 10 is housed in a housing or casing having an inlet port or duct 11 at the top of the casing. The casing has a plurality of outlet ports or ducts 12 extending substantially coplanarly in a plane substantially perpendicular to the axis of the inlet duct 11 and an exhaust or drain port or duct 13 extending substantially coplanarly with said outlet ports.

The valve may be remote controlled via any suitable driving means such as, for example, an electric motor housed in a motor housing or casing 15 of any suitable material such as, for example, cast iron, steel or durable plastic material. The casing of the valve 10 comprises a main housing portion 17 and a cap or cover portion 18. The main housing and cap portions 17 and 18 are affixed to each other by any suitable means such as, for example, threaded members or screws 19.

Each of the main housing portion 17 and the cap portion 18 comprises hard, durable plastic material such as, for example, tetrafluorethylene, which is commercially available as Delrin, and which does not shrink, swell, warp, or otherwise become misshapen, or disintegrate, after a long period of use. Another advantage of the plastic material Delrin is that it has very low friction in abutting, sliding, gliding or rubbing contact.

The main housing and cover portions 17 and 18 of the housing are affixed to the motor housing 15 by any suitable means such as, for example, threaded members or screws 20. Although a pair of screws 19 and a pair of screws 20 are shown, any suitable number of each such as, for example, four, may be utilized.

The valve 10 includes a rotatable valve member 22, as shown in FIGS. 2 to 5. The rotatable valve member 22 is of substantially cylindrical configuration having an altitude or axis which is small relative to its radius. The valve member 22 fits in a circular bore, recess, hole, or the like, 23 formed in the main housing portion 17 of the casing, as shown in FIG. 2. The valve member 22 comprises the plastic material Delrin, so that it has very low friction in abutting or rubbing contact and does not become misshapen, or disintegrate, after a long period of use.

A central pin member 25 of substantially cylindrical configuration, as shown in FIGS. 3, 4 and 5, comprising metal, is mounted in the valve member 22 and functions as a bearing for said valve member. The pin member 25 has a coupling part 26 extending below said pin member substantially along the axis of the valve 10. The coupling part 26 is of substantially cylindrical configuration and fits in a hole, bore, or the like, 27 formed through the main housing portion of the valve. The coupling part 26 has a lug 28 projecting or extending below the cylindrical part thereof, as shown in FIGS. 3, 4 and 5.

The driving motor housed in the motor housing 15 has a drive shaft 29, the end of which is shown in FIG. 3. The end of the drive shaft 29 has a notch or groove 30 formed therein for accommodating the leg 28 to enable the driving motor (not shown in the FIGS.) to drive or rotate the valve member 22 about its axis, which substantially coincides with the axis of the valve 10.

A seal, sealing gasket or O-ring 31, as shown in FIGS. 3 and 5, is provided at the upper end of the pin member 25, for sealing said pin member in a recess, hole or bore 33 (FIG. 3) formed in the cover portion 18 of the valve 10. The pin member 25 has an opening, hole, bore, or the like, 40 formed therein and extending along the axis thereof. The bore 40 opens into a substantially annular groove, notch, recess, or the like, 34 formed around the periphery of the pin member 25, as shown in FIGS. 3, 4 and 5.

A duct, conduit or bore 41 is formed in the valve member 22 extending substantially perpendicularly to the axis of said valve member. The groove 34 and the duct 41 are aligned with each other, as shown in FIG. 5. That is, the duct 41 opens into the groove 34. The bore or channel 41 may be conveniently drilled from outside the valve member 22 and the open end thereof may be blocked, closed or sealed by any suitable means such as, for example, a threaded plug 43, as shown in FIG. 5. A duct, conduit, channel or bore 44 is formed in the valve member 22 extending substantially parallel to the axis of said valve member and connecting the duct 41 to the bottom surface of said valve member, as shown in FIG. 5, and opening at said bottom surface.

A seal, sealing gasket or O-ring 47 is mounted in an annular recess, groove, notch or channel 47a coaxially formed in the bottom surface of the valve member 22, as shown in FIG. 5, to provide a substantially frictionless tight seal. The O-ring 47 may comprise the plastic material Teflon, which is essentially similar to Delrin, and which is commercially available. This prevents scoring of the mating main housing portion 17 of the valve. The O-ring 47 is resiliently held in position by another seal, sealing gasket or O-ring 48 comprising rubber (FIG. 5). The combination of the O-rings 47 and 48 assures a tight seal which remains effective during a long period of use.

The pressure from the inlet port 11 exerts a downward force on the top surface of the pin member 25 which causes the O-rings 47 and 48 to seal the duct 44 of the valve member 22 and a selected outlet duct, channel, conduit or bore 45 formed in the main housing portion 17 of the valve 10, as shown in FIG. 3. A plurality of bores, ducts, channels or conduits 45 are formed in the main housing portion 17 of the valve extending radially and angularly spaced substantially coplanarly in a plane substantially perpendicular to the axis of said valve. Each of the conduits 45 opens at one end into a corresponding one of the outlet ports 12 and at its other end into a corresponding opening in the bottom surface of the bore 23 of the main housing portion 17.

An exhaust conduit, bore, duct or channel 49, shown in broken lines in FIG. 3, is formed in the main housing portion 17 of the valve and extends coplanarly with the conduits 45. The exhaust conduit opens at one end into the exhaust port 13 and at its other end into a corresponding opening in the bottom surface of the bore 23 of the main housing portion 17. The exhaust conduit 49 exhausts fluid returning from the load on the selected one of the outlet ports 12 after the rotatable valve member 22 moves to the next selected one of said outlet ports.

In operation, the driving motor (not shown in the FIGS.) is controlled or energized either automatically by a control system, or manually (neither being shown in the FIGS.) to drive said motor as desired. The motor functions to rotate the rotatable valve member 22 in steps or increments to connect the opening of the duct 44 of said valve member to the opening of each of the ducts 45 of the main housing portion 17 of the valve, in succession. Fluid such as, for example, water, is thus directed by the valve 10 from the inlet port 11 to each of the outlet ports 12, in succession.

The sequence of selection of the outlet ports 12 depends upon the direction of rotation of the driving motor. Thus, when the motor rotates in one of the clockwise and counterclockwise directions, the outlet ports 12 are selected in one of the clockwise and counterclockwise directions. When the motor rotates in the other of the clockwise and counterclockwise directions, the outlet ports 12 are selected in the other of the clockwise and counterclockwise directions. The selected outlet port discharges the fluid as long as it is supplied via the inlet port 11 and until the motor steps the rotatable valve member 22 to the next succeeding outlet port.

While the invention has been described by means of a specific example and in a specific embodiment, I do not wish to be limited thereto, for obvious modifications will occur to those skilled in the art without departing from the spirit and scope of the invention.

What I claim is:

1. A valve, comprising a housing having an axis, a main housing portion having a peripheral surface, a substantially axial recess formed therein and a plurality of angularly spaced conduits formed therein and opening at said recess and extending radially substantially perpendicularly to the axis of the housing to the peripheral surface of the main housing portion, and a cover portion having a substantially axial bore formed therethrough;

an inlet port opening into the bore of the cover portion of the housing;

a plurality of outlet ports at the peripheral surface of the main housing portion of the housing each opening into a corresponding one of the conduits; and a rotatable valve member of Delrin coaxially positioned in the recess in the main housing portion of the housing and having duct means therein for conducting fluid from the inlet port to each of the outlet ports via the conduits of the main housing portion of the housing in sequence, said valve member being adapted to be rotated about its axis to connect the duct means thereof to each of the conduits in sequence and being of substantially cylindrical configuration having an axis which is small relative to its radius and fitting in the recess in the main housing portion of the housing, a bearing for the valve member comprising a metal central pin member coaxially mounted in the cylindrical part thereof and having an area fitting into part of the bore formed through the cover portion of the housing, and a sealing O-ring around the pin member in the area thereof fitting into the part of the bore of the cover portion for sealing said pin member in said bore, the pin member being of substantially cylindrical configuration having a periphery with a substantially annular groove formed therearound and a bore formed therein along the axis thereof and opening into the groove, and the cylindrical part of the valve member having a bottom surface and a conduit formed in said valve member and extending substantially perpendicularly to the axis of the valve member and opening from the groove of the pin member to the bottom surface of the cylindrical part of the valve member at a point at which said conduit opens into each of the conduits formed in the main housing portion of the valve at the recess of said main housing portion as the valve member rotates about its axis.

2. A valve as claimed in claim 1, wherein each of the main housing portion and the cover portion of the housing comprises plastic material.

3. A valve as claimed in claim 1, wherein each of the main housing portion and the cover portion of the housing comprises Delrin.

4. A valve as claimed in claim 1, further comprising a drain port at the peripheral surface of the main housing portion of the housing and an exhaust conduit formed in the main housing portion and extending substantially perpendicularly to the axis of the housing from the recess formed therein to the peripheral surface thereof at the drain port.

5. A valve as claimed in claim 1, wherein the cylindrical part of the valve member has an annular notch coaxially formed in the bottom surface thereof, and further comprising a sealing Teflon O-ring in the notch and a sealing rubber O-ring coaxially positioned in the notch and in juxtaposition with the Teflon O-ring for resiliently holding the Teflon O-ring in position and for providing a tight seal around the conduit opening at the bottom surface of the cylindrical part of the valve member.

* * * * *